United States Patent
Ding et al.

(10) Patent No.: US 8,340,232 B2
(45) Date of Patent: Dec. 25, 2012

(54) APPARATUS AND METHOD FOR CHANNEL ESTIMATION USING TRAINING SIGNALS WITH REDUCED SIGNAL OVERHEAD

(75) Inventors: Yinong Ding, Plano, TX (US); Farooq Khan, Allen, TX (US); Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 2142 days.

(21) Appl. No.: 11/297,879

(22) Filed: Dec. 9, 2005

(65) Prior Publication Data

US 2007/0165726 A1    Jul. 19, 2007

(51) Int. Cl.
*H04B 7/10* (2006.01)
*H04L 1/02* (2006.01)

(52) U.S. Cl. ............................................. 375/347
(58) Field of Classification Search .................. 375/347
See application file for complete search history.

(56) References Cited

U.S. PATENT DOCUMENTS

| 2002/0122382 A1* | 9/2002 | Ma et al. .................. 370/208 |
| 2003/0058926 A1* | 3/2003 | Balakrishnan et al. ....... 375/146 |
| 2004/0100939 A1* | 5/2004 | Kriedte et al. ............... 370/347 |
| 2006/0013186 A1* | 1/2006 | Agrawal et al. ............. 370/344 |
| 2006/0198461 A1* | 9/2006 | Hayase ........................ 375/267 |

* cited by examiner

*Primary Examiner* — David C. Payne
*Assistant Examiner* — Tanmay Shah (57) ABSTRACT

A base station comprising an antenna array including M antennas for transmitting data to a plurality of subscriber stations. The base station generates a first pilot signal preamble by adding a first cyclic prefix to a first pilot signal sequence and generates a second pilot signal preamble by adding a second cyclic prefix to a second pilot signal sequence. The second pilot signal sequence is a circularly shifted copy of the first pilot signal sequence. The first pilot signal preamble is transmitted from a first antenna and the second pilot signal preamble is transmitted from a second antenna concurrently with transmission of the first preamble.

20 Claims, 5 Drawing Sheets

APPARATUS AND METHOD FOR CHANNEL ESTIMATION USING TRAINING SIGNALS WITH REDUCED SIGNAL OVERHEAD

TECHNICAL FIELD OF THE INVENTION

The present application relates generally to wireless communications and, more specifically, to a channel estimation technique having reduced signaling overhead for use in multiple-input, multiple-output (MIMO) systems.

BACKGROUND OF THE INVENTION

An increasing number of wireless networks are implemented as multiple-input, multiple-output (MIMO) systems that use multiple antennas to communicate with subscriber stations (also called mobile stations, mobile terminals, and the like). For example, MIMO antenna systems are used in code division multiple access (CDMA) networks, time division multiplexing (TDM) networks, time division multiple access (TDMA) networks, orthogonal frequency division multiplexing (OFDM) networks, orthogonal frequency division multiple access (OFDMA) networks, and others. In order to maximize throughput, MIMO networks use a variety of channel estimation techniques to measure the transmission channels between base stations of the wireless networks and mobile devices.

For example, a MIMO base station may transmit a first pilot signal from a first antenna and a second pilot signal from a second antenna. A subscriber station receives both pilot signals and uses each pilot signal to perform channel estimation for each antenna. The symbols of the pilot signals are transmitted on orthogonal subcarriers to prevent the pilot signals from interfering with each other. No data symbols are transmitted on the subcarriers of the pilot signals. If more than two antennas are used, each antenna transmits a separate pilot signal on a dedicated subcarrier that is orthogonal to the other pilot signal subcarriers. The drawback to this method is that a large amount of signaling overhead is used for channel estimation. This wastes bandwidth and reduces system capacity.

Besides achieving pilot orthogonality in the dimension of the subcarriers, the pilot orthogonality may also achieved in the dimension of time. A MIMO base station may transmit separate pilot signals from different antennas using time multiplexing to separate the pilot signals. For example, during a first transmit time, the base station may transmit a first pilot signal from a first antenna. Then, during a second transmit time, the base station may transmit a second pilot signal from a second antenna. If more than two antennas are used, each antenna transmits a separate pilot signal during a separate transmit time. The drawback to this method is that more time slots are needed for pilot signals, thereby reducing the number of time slots available for transmitting user data. As before, this reduces system capacity.

In some CDMA systems, multiple pilot signals are transmitted simultaneously from multiple antennas, but they are separated in the dimension of "code". The pilots from all antennas are transmitted with preambles that use different pseudo-random noise (PN) codes. This reduces the number of time slots required for pilot signals. However, the drawback to this method is that the receiver circuitry in the mobile device must use complicated interference cancellation techniques to recover the MIMO pilot signals. This method reduces pilot signaling overhead at the cost of a more complicated pilot recovery scheme. This method also decreases the reliability of the channel estimates.

Therefore, there is a need in the art for an improved apparatus and method for performing channel estimation in a multiple-input, multiple-output (MIMO) wireless network.

SUMMARY OF THE INVENTION

In one embodiment, a base station is disclosed comprising an antenna array including M antennas for transmitting data to a plurality of subscriber stations. The channel estimation scheme is described in the context of an OFDM system. The base station generates a first pilot signal preamble by adding a first cyclic prefix to a first pilot signal sequence and generates a second pilot signal preamble by adding a second cyclic prefix to a second pilot signal sequence, wherein the second pilot signal sequence is a circularly shifted copy of the first pilot signal sequence. The first pilot signal preamble is transmitted from a first one of the M antennas and the second pilot signal preamble is transmitted from a second one of the M antennas. The first and second pilot signal preambles are transmitted concurrently.

In another embodiment, a method is disclosed for transmitting data from M antennas capable of transmitting to a plurality of subscriber stations. The disclosed method comprises the steps of: generating a first pilot signal preamble by adding a first cyclic prefix to a first pilot signal sequence; generating a second pilot signal preamble by adding a second cyclic prefix to a second pilot signal sequence, wherein the second pilot signal sequence is a circularly shifted copy of the first pilot signal sequence; transmitting the first pilot signal preamble from a first one of the M antennas; and transmitting the second pilot signal preamble from a second one of the M antennas. The first and second pilot signal preambles are transmitted concurrently.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The disclosed apparatus and method for estimating wireless communication channels use pilot (or training) signals that reduce signaling overhead and require only a simple channel response estimator in the receiver of the mobile device (i.e., subscriber station, mobile station, mobile terminal, etc.). In the description that follows, the channel estimation apparatus is embodied in an orthogonal frequency division multiple access (OFDMA) wireless network using a multiple-input, multiple-output (MIMO) antenna system. However, this is by way of illustration only and should not be construed to limit the scope of the disclosure and the claims herein. Those skilled in the art will understand that the disclosed apparatus and method may be easily adapted for use in any type of wireless network that uses a multiple-input, multiple-output (MIMO) antenna system.

Figure 1:
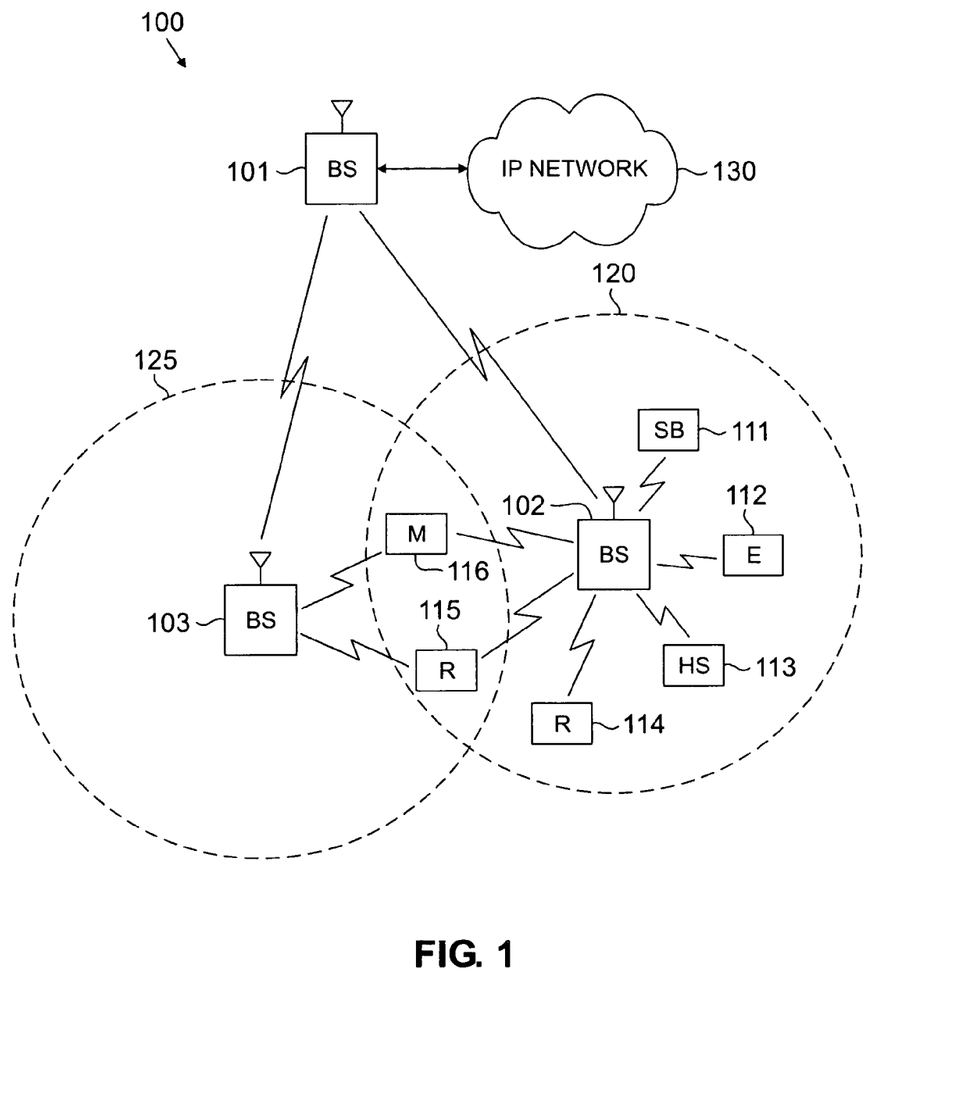
FIG. 1 illustrates a wireless network that implements channel estimation according to the principles of the disclosure.

FIG. 1 illustrates exemplary wireless network 100, which implements channel estimation according to the principles of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device. Base station 103 also provides wireless broadband access to network 130, via base station 101, to a second plurality of subscriber stations within coverage area 125 of base station 103. The second plurality of subscriber stations includes SS 115 and SS 116.

In order to maximize throughput, wireless network 100 estimates the communication channels between base stations 101-103 and subscriber stations 111-116. The apparatus and method for estimating channels disclosed herein use pilot (or training) signals that reduce signaling overhead and require only a simple channel response estimator in the receivers of subscriber stations 111-116.

Figure 2:
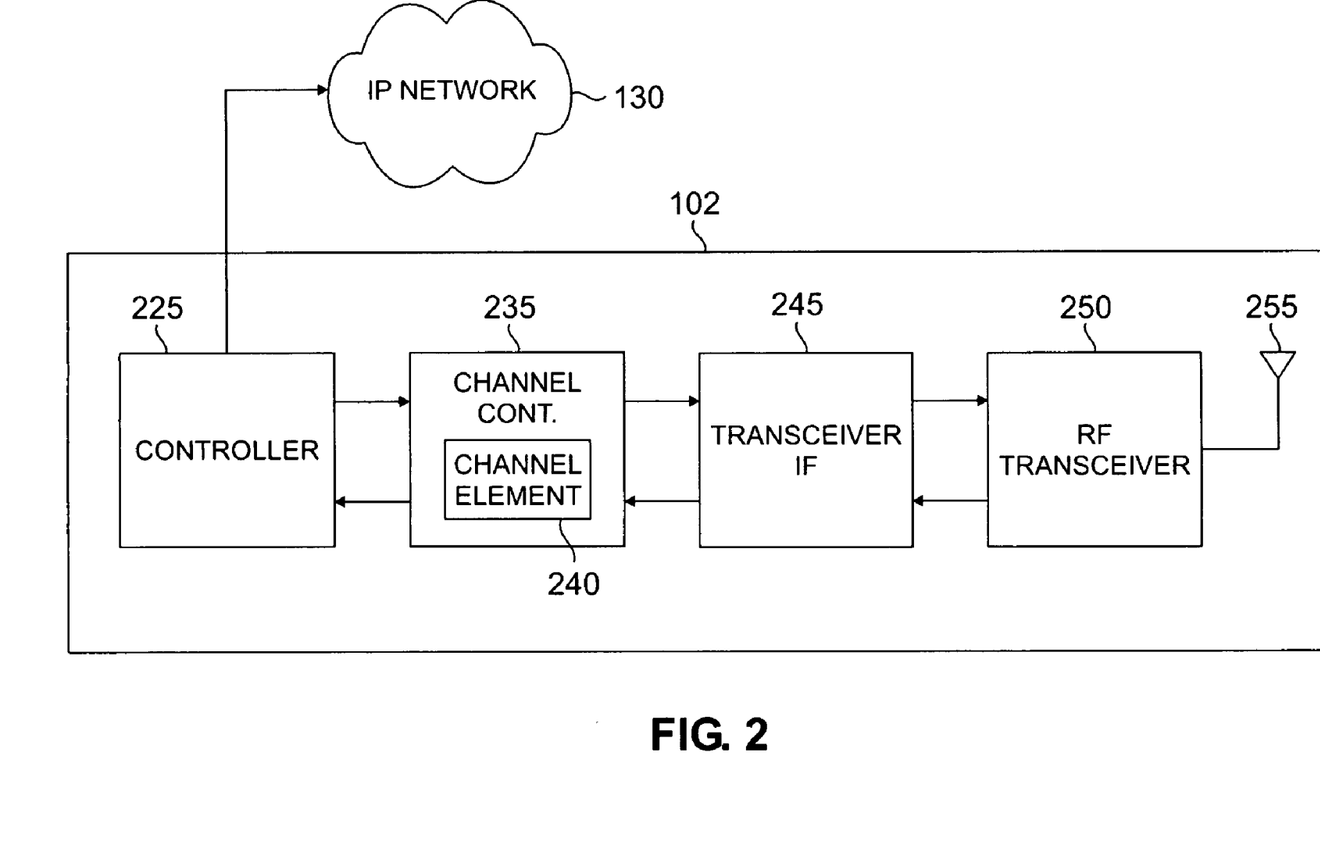
FIG. 2 illustrates a base station that implements channel estimation according to the principles of the disclosure.

FIG. 2 illustrates in greater detail exemplary base station 102, which implements channel estimation according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255. According to the principles of the present disclosure, antenna array 255 is a multiple-input, multiple output (MIMO) antenna system.

Controller 225 comprises processing circuitry and memory capable of executing an operating program that controls the overall operation of base station 102. In an embodiment, the controller 225 may be operable to communicate with the network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Furthermore, according to the principles of the present disclosure, antenna array 255 is a multiple-input, multiple-output (MIMO) antenna system that uses multiple antennas to transmit pilot signals and user data to subscriber stations 111-116. Each antenna transmits its own pilot signal. Subscriber stations 111-116 use the pilot signals to estimate the channel response for each antenna in antenna array 255 using well-known channel estimation techniques.

Figure 3:
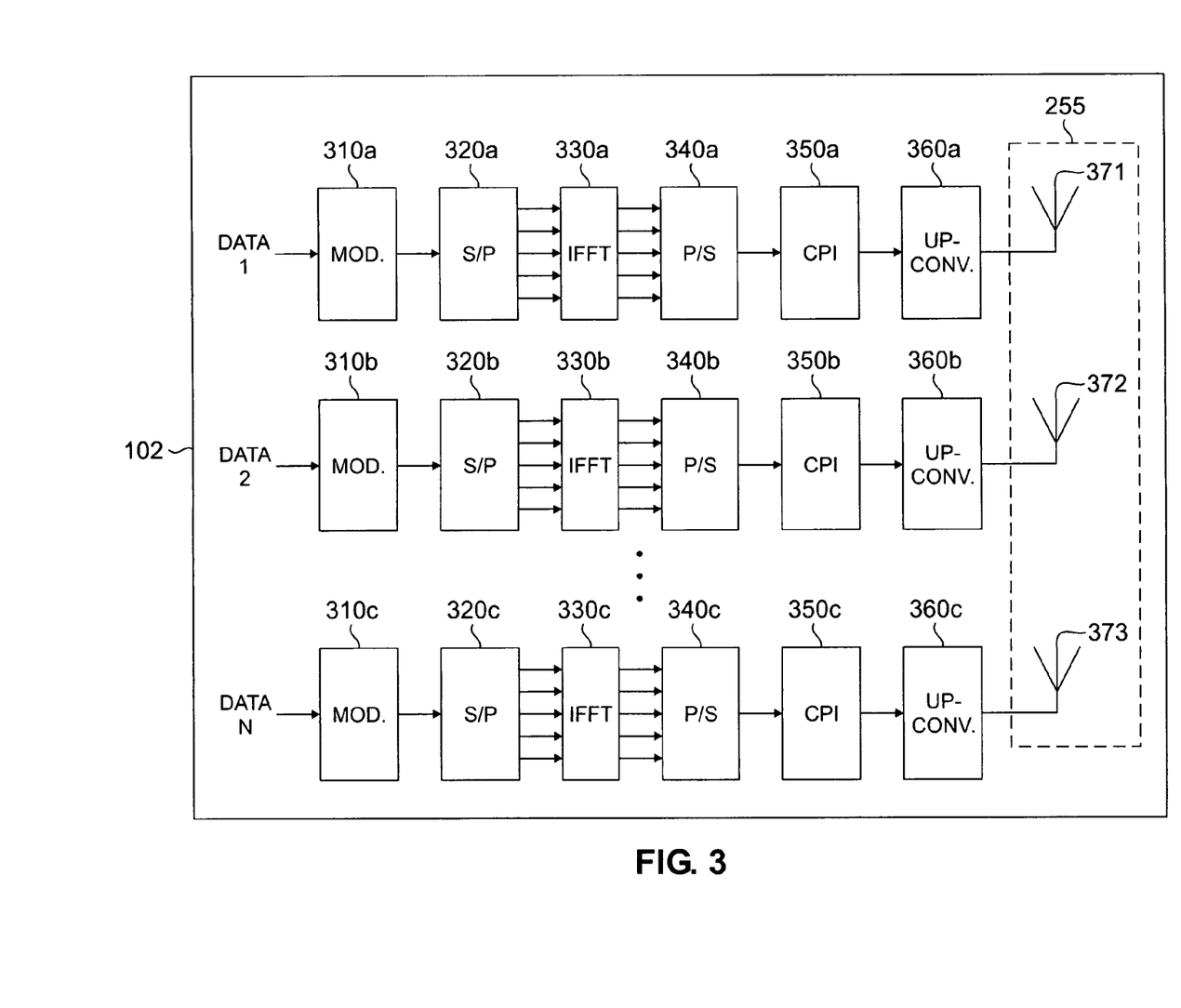
FIG. 3 illustrates selected portions of the transmitter circuitry in a base station according to an exemplary embodiment of the present disclosure.

FIG. 3 illustrates selected portions of the transmitter circuitry in base station 102 according to an exemplary embodiment of the present disclosure. Base station 102 comprises N modulation blocks 310, including exemplary modulation blocks 310a-310c, serial-to-parallel (S/P) converters 320, including exemplary S/P converters 320a-320c, inverse Fast Fourier Transform (IFFT) blocks 330, including exemplary IFFT blocks 330a-330c, parallel-to-serial (P/S) converters 340, including exemplary parallel-to-serial (P/S) converters 340a-340c, cyclic prefix insertion (CPI) blocks 350, including exemplary CPI blocks 350a-350c, up-conversion blocks 360, including exemplary up-conversion blocks 360a-360c, and antenna array 255. Antenna array 255 comprises M antennas, including exemplary antennas 371, 372 and 373.

In FIG. 3, individual transmit paths are shown for individual user data inputs, such as Data 1, Data 2 and Data N. Each transmit path includes its own components, such as modulator block 310, IFFT block 330, and so forth. However, this is done for the purposes of simplicity and clarity in explaining the operation of base station 102. In practice, many of the separate components in each transmit path may be implemented by a single functional block. For example, IFFT blocks 330a, 330b and 330c may all be part of a single IFFT component in base station 102. Similarly, up-conversion blocks 360a, 360b and 360c may be implemented by a single up-converter in base station 102. Additionally, some of the components in each transmit path are distributed across different ones of channel controller 235, transceiver IF 245 and RF transceiver 250 in FIG. 2.

In each transmit path, modulation block 310 receives an input data stream (e.g., Data 1) and modulates the input data to produce modulated symbols according to any known modulation technique. The modulated symbols are converted to parallel format by S/P converter 320 and mapped onto a plurality of orthogonal subcarriers in the frequency domain as inputs to the IFFT block 330. The outputs of IFFT block 330 are converted into serial data by P/S converter 340. Cyclic prefix insertion block 350 then adds a cyclic prefix to the output of the P/S converter 340. The output of CPI block 350 is up-converted by up-conversion block 360 for transmission via an antenna (e.g., antenna 371) in antenna array 255.

In each transmission time interval (TTI), base station 102 transmits a sequence of OFDM data symbols that is preceded by a pilot symbol (i.e., preamble) that trains the receiver and is used for channel estimation. CPI block 350 adds a cyclic prefix to each OFDM data symbol and to each pilot signal symbol. Thus, the first symbol of each TTI is a pilot signal preamble formed from an N-sample long pseudo-random noise (PN) code. The remaining symbols in each TTI are OFDM symbols carrying the information data.

As is well known, the result of the preamble passing through a wireless channel with a channel response, h(t), is the N-point circular convolution of p(t), the pilot signal sequence (i.e., the PN sequence/code), and h(t), the impulse response of the wireless channel. This is expressed as p(t)⊖h(t), where ⊖ represents the N-point circular convolution operation.

For a MIMO system, such as base station 102, with M transmit antennas, CPI block 350 receives a pilot signal sequence, namely a PN code, p(t), and appends a cyclic prefix to the start of the pilot signal sequence. Thus, a first pilot signal preamble transmitted from a first antenna (e.g., antenna 371) is formed directly from the original PN code. A second preamble transmitted by a second antenna (e.g., antenna 372) is generated by circularly shifting the same PN code by L samples to produce a second pilot signal sequence and adding a second cyclic prefix. A third preamble transmitted by a third antenna (e.g., antenna 373) is generated by circularly shifting the second pilot signal sequence by an additional L samples to produce a third pilot signal sequence and adding a third cyclic prefix.

Figure 4:
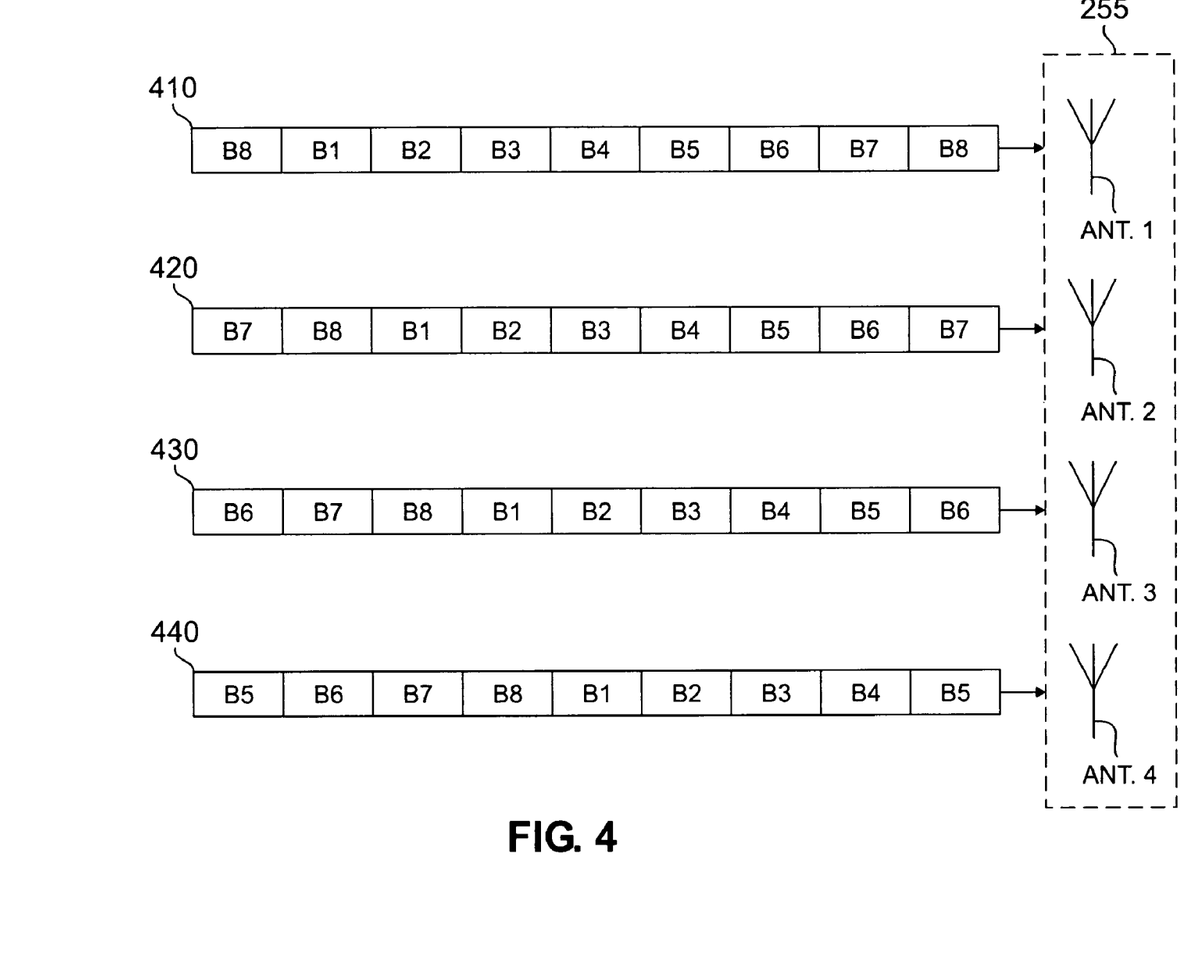
FIG. 4 illustrates four exemplary preambles transmitted by a base station using four antennas according to an exemplary embodiment.

FIG. 4 illustrates four exemplary pilot signal preambles transmitted by base station 102 using four antennas according to an exemplary embodiment. The antennas in antenna array 255 are labeled Antenna 1, Antenna 2, Antenna 3, and Antenna 4 in this example. Base station 101 sends preamble 410 to Antenna 1, preamble 420 to Antenna 2, preamble 430 to Antenna 3, and preamble 440 to Antenna 4. In the exemplary embodiment, each pilot signal preamble is generated from an original pilot signal sequence that is a pseudo-random noise (PN) code that is 512 samples in length. The choice of 512 samples is by way of example only. In other embodiments, the PN code may contain more than 512 samples or less than 512 samples.

The 512 sample PN code is logically divided into eight (8) blocks, where each block contains 64 samples. The blocks are sequentially labeled [B1 B2 B3 B4 B5 B6 B7 B8]. As is well known, a cyclic prefix for a block of N data samples is created by copying the last L samples of the block of N data samples and appending them to the front of the block of N data samples. This increases the length of the block to N+L data samples, where the first L samples and the last L samples of the block of N+L data samples are the same. Ideally, the value of L is at least as long as the channel impulse response length.

In base station 102, CPI block 350 generates preamble 410 by copying the last L=64 samples (i.e., block B8) of the original pilot signal sequence, namely the 512-sample PN code [B1 B2 B3 B4 B5 B6 B7 B8]. CPI block 350 then appends block B8 to the start of the original pilot signal sequence to form preamble 410. Thus, the blocks of preamble 410 are transmitted in the following order: [B8 B1 B2 B3 B4 B5 B6 B7 B8].

CPI block 350 generates preamble 420 in parallel with preamble 410. CPI block 350 generates preamble 420 by circularly shifting the 512-sample PN code [B1 B2 B3 B4 B5 B6 B7 B8] by 64 samples to the right to generate a second pilot signal sequence, namely a new 512-sample PN code: [B8 B1 B2 B3 B4 B5 B6 B7]. Next, CPI block 350 copies the last 64 samples of the new 512-sample PN code, namely the 64 samples in block B7, and appends block B7 to the start of the second pilot signal sequence. Thus, the blocks of preamble 420 are transmitted in the following order: [B7 B8 B1 B2 B3 B4 B5 B6 B7].

CPI block 350 generates preamble 430 in parallel with preambles 410 and 420. CPI block 350 generates preamble 430 by circularly shifting a second time the second pilot signal sequence, namely the 512-sample PN code [B8 B1 B2 B3 B4 B5 B6 B7], by an additional 64 samples to the right to generate a third pilot signal sequence, namely the new 512-sample PN code: [B7 B8 B1 B2 B3 B4 B5 B6]. Next, CPI block 350 copies the last 64 samples of the new 512-sample PN code, namely the 64 samples in block B6, and appends block B6 to the start of the third pilot signal sequence. Thus, the blocks of preamble 430 are transmitted in the following order: [B6 B7 B8 B1 B2 B3 B4 B5 B6].

CPI block 350 generates preamble 440 in parallel with preambles 410, 420 and 430. CPI block 350 generates preamble 440 by circularly shifting a third time the second pilot signal sequence, namely the 512-sample PN code [B7 B8 B1 B2 B3 B4 B5 B6], by an additional 64 samples to the right to generate a fourth pilot signal sequence, namely the new 512-sample PN code: [B6 B7 B8 B1 B2 B3 B4 B5]. Next, CPI block 350 copies the last 64 samples of the new 512 sample PN code, namely the 64 samples in block B5, and appends block B5 to the start of the fourth pilot signal sequence. Thus, the blocks of preamble 440 are transmitted in the following order: [B5 B6 B7 B8 B1 B2 B3 B4 B5].

It is noted that the circular shift of 64 samples for each one of preambles 420, 430 and 440 is by way of example only. In alternate embodiments, a circular shift of more than 64 samples or less than 64 samples may be used.

After transmission from Antennas 1, 2, 3 and 4, preambles 410, 420, 430 and 440 are received at a subscriber station at the same time. At the receiving subscriber station, it is assumed that the channel response for Antenna 1 is $h_1(t)$, the channel response for Antenna 2 is $h_2(t)$, the channel response for Antenna 3 is $h_3(t)$, and the channel response for Antenna 4 is $h_4(t)$. Thus, the baseband signal, r(t), in the receiving subscriber station may be represented as:

$$r(t)=p(t)\Theta h_1(t)+p[t-64]_N\Theta h_2(t)+p[t-128]_N\Theta h_3(t)+p[t-192]_N\Theta h_4(t)+n(t)$$

In the above equation, $p[t-1]_N$ is the L-sample circularly shifted version of the N-sample long sequence p(t) and n(t) is the white Gaussian noise. In this example, L=64 and N=512.

Figure 5:
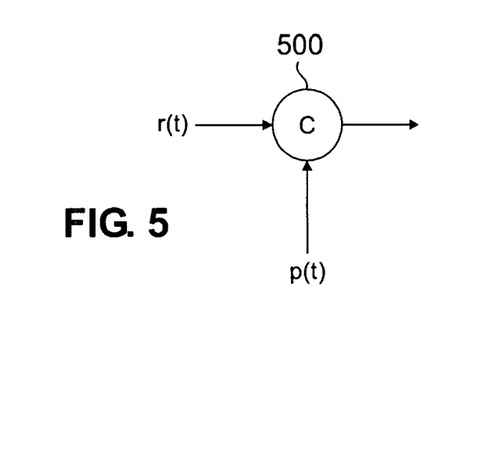
FIG. 5 illustrates a cross-correlation circuit in a subscriber station.

In the absence of noise, the channel responses $h_1(t)$, $h_2(t)$, $h_3(t)$, and $h_4(t)$ may be ideally identified by the circular (cross) correlation of r(t) and p(t). FIG. 5 illustrates cross-correlation circuit 500 in a subscriber station. Cross-correlation circuit 500 receives the baseband signal, r(t), and the original 512 sample PN code, p(t), of the pilot signal and generates the channel responses $h_1(t)$, $h_2(t)$, $h_3(t)$, and $h_4(t)$.

Figure 6:
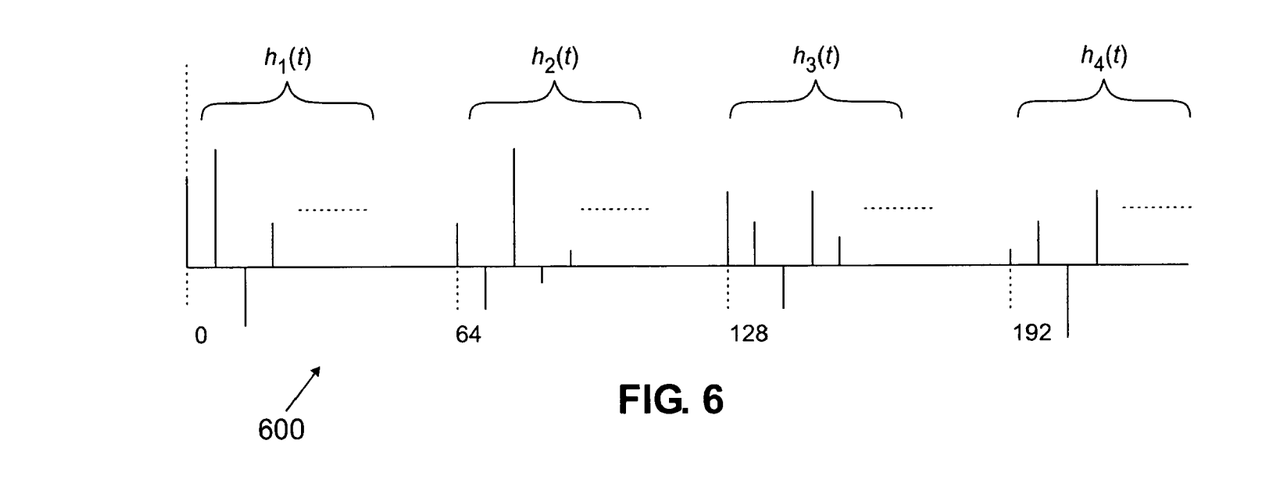
FIG. 6 illustrates the estimation of the channel responses $h_1(t)$, $h_2(t)$, $h_3(t)$, and $h_4(t)$ from the four (4) base station antennas to the receiving subscriber station according to one embodiment.

FIG. 6 depicts timing diagram 600, which illustrates the estimation of the channel responses $h_1(t)$, $h_2(t)$, $h_3(t)$, and $h_4(t)$ in the receiving subscriber station according to one embodiment. Because of the circular shifts of preambles 420, 430 and 440 with respect to preamble 410, the receiver in the subscriber station sequentially detects the channel responses $h_1(t)$, $h_2(t)$, $h_3(t)$, and $h_4(t)$. Thus, it is not necessary to include complex cancellation circuitry in the receiver to cancel, for example, the channel response $h_1(t)$ from the channel response $h_2(t)$.

The disclosed apparatus and method employ the circular shift orthogonal property of a pre-designed pseudo-random (PN) code. Each antenna transmits a circularly shifted version of the PN code, and at the receiver, one cross-correlation operation enables the identification of all channel responses, as long as the product (L×M) of the channel impulse response length, L, and the number of antennas, M, does not exceed the length N of the PN code.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station configured to communicate with a plurality of subscriber stations of a wireless network, the base station comprising:
    an antenna array comprising a plurality of antennas configured to transmit data to the plurality of subscriber stations; and
    a cyclic prefix insertion block configured to:
        generate a first pilot signal preamble by adding a first cyclic prefix to a first pilot signal sequence;
        generate a second pilot signal preamble by adding a second cyclic prefix to a second pilot signal sequence; and
        transmit the first and second pilot signal preambles through the plurality of antennas,
        wherein the second pilot signal sequence is a circularly shifted copy of the first pilot signal sequence,
        wherein the first cyclic prefix comprises the last one or more samples of the first pilot signal sequence, and
        wherein a product of the length of the first and second cyclic prefix and the number of antennas does not exceed a length of the first and second pilot signal sequence, respectively.

2. The base station as set forth in claim 1, wherein the cyclic prefix insertion block is configured to transmit the first pilot signal preamble from a first one of the plurality of antennas and the second pilot signal preamble from a second one of the plurality of antennas, wherein the first and second pilot signal preambles are transmitted concurrently.

3. The base station as set forth in claim 2, wherein the first pilot signal sequence comprises a pseudo-random noise code.

4. The base station as set forth in claim 3, wherein the cyclic prefix insertion block is configured to generate the second pilot signal sequence by circularly shifting the first pilot signal sequence by one or more samples to the right.

5. The base station as set forth in claim 4, wherein the second cyclic prefix comprises the last one or more samples of the second pilot signal sequence.

6. The base station as set forth in claim 2, wherein the cyclic prefix insertion block is configured to generate a third pilot signal preamble by adding a third cyclic prefix to a third pilot signal sequence, wherein the third pilot signal sequence comprises a circularly shifted copy of the second pilot signal sequence.

7. The base station as set forth in claim 6, wherein the cyclic prefix insertion block is configured to transmit the third pilot signal preamble from a third one of the plurality of antennas, wherein the first, second and third pilot signal preambles are transmitted concurrently.

8. A wireless network comprising a plurality of base stations configured to communicate with a plurality of subscriber stations, each one of the plurality of base stations comprising:
    an antenna array comprising a plurality of antennas configured to transmit data to the plurality of subscriber stations; and
    a cyclic prefix insertion block configured to:
        generate a first pilot signal preamble by adding a first cyclic prefix to a first pilot signal sequence;
        generate a second pilot signal preamble by adding a second cyclic prefix to a second pilot signal sequence; and
        transmit the first and second pilot signal preambles through the plurality of antennas,
        wherein the second pilot signal sequence is a circularly shifted copy of the first pilot signal sequence, wherein the second cyclic prefix comprises the last one or more samples of the second pilot signal sequence,
        wherein a product of the length of the first and second cyclic prefix and the number of antennas does not exceed a length of the first and second pilot signal sequence, respectively.

9. The wireless network as set forth in claim 8, wherein the cyclic prefix insertion block is configured to transmit the first pilot signal preamble from a first one of the plurality of antennas and the second pilot signal preamble from a second one of the plurality of antennas, wherein the first and second pilot signal preambles are transmitted concurrently.

10. The wireless network as set forth in claim 9, wherein the first pilot signal sequence comprises a pseudo-random noise code.

11. The wireless network as set forth in claim 10, wherein the first cyclic prefix comprises the last one or more samples of the first pilot signal sequence.

12. The wireless network as set forth in claim 11, wherein the cyclic prefix insertion block is configured to generate the second pilot signal sequence by circularly shifting the first pilot signal sequence by one or more samples to the right.

13. The wireless network as set forth in claim 12, wherein the cyclic prefix insertion block is configured to generate a third pilot signal preamble by adding a third cyclic prefix to a third pilot signal sequence, wherein the third pilot signal sequence comprises a circularly shifted copy of the second pilot signal sequence.

14. The wireless network as set forth in claim 13, wherein the cyclic prefix insertion block is configured to transmit the third pilot signal preamble from a third one of the plurality of antennas, wherein the first, second and third pilot signal preambles are transmitted concurrently.

15. A method for transmitting from an antenna array comprising a plurality of antennas that transmit data to a plurality of subscriber stations, the method comprising:
    generating a first pilot signal preamble by adding a first cyclic prefix to a first pilot signal sequence;

generating a second pilot signal preamble by adding a second cyclic prefix to a second pilot signal sequence, wherein the second pilot signal sequence is a circularly shifted copy of the first pilot signal sequence;

transmitting the first pilot signal preamble from a first one of the plurality of antennas; and transmitting the second pilot signal preamble from a second one of the plurality of antennas, wherein the first and second pilot signal preambles are transmitted concurrently, wherein the first cyclic prefix comprises the last one or more samples of the first pilot signal sequence, and wherein a product of the length of the first and second cyclic prefix and the number of antennas does not exceed a length of the first and second pilot signal sequence, respectively.

16. The method as set forth in claim 15, wherein the first pilot signal sequence comprises a pseudo-random noise code.

17. The method as set forth in claim 16, wherein generating the second pilot signal sequence comprises generating the second pilot signal sequence by circularly shifting the first pilot signal sequence by one or more samples to the right.

18. The method as set forth in claim 17, wherein the second cyclic prefix comprises the last one or more samples of the second pilot signal sequence.

19. A base station comprising an antenna array including a plurality of antennas configured to transmit data to a plurality of subscriber stations, wherein the base station is configured to:

generate a first pilot signal preamble by adding a first cyclic prefix to a first pilot signal sequence ; and generate a second pilot signal preamble by adding a second cyclic prefix to a second pilot signal sequence, wherein the second pilot signal sequence comprises a circularly shifted copy of the first pilot signal sequence, wherein the first cyclic prefix comprises the last one or more samples of the first pilot signal sequence, and wherein a product of the length of the first and second cyclic prefix and the number of antennas does not exceed a length of the first and second pilot signal sequence, respectively.

20. The base station as set forth in claim 19, wherein the base station is configured to transmit the first pilot signal preamble from a first one of the plurality of antennas and the second pilot signal preamble from a second one of the plurality of antennas, wherein the first and second pilot signal preambles are transmitted concurrently.

* * * * *